United States Patent Office 3,297,300
Patented Jan. 10, 1967

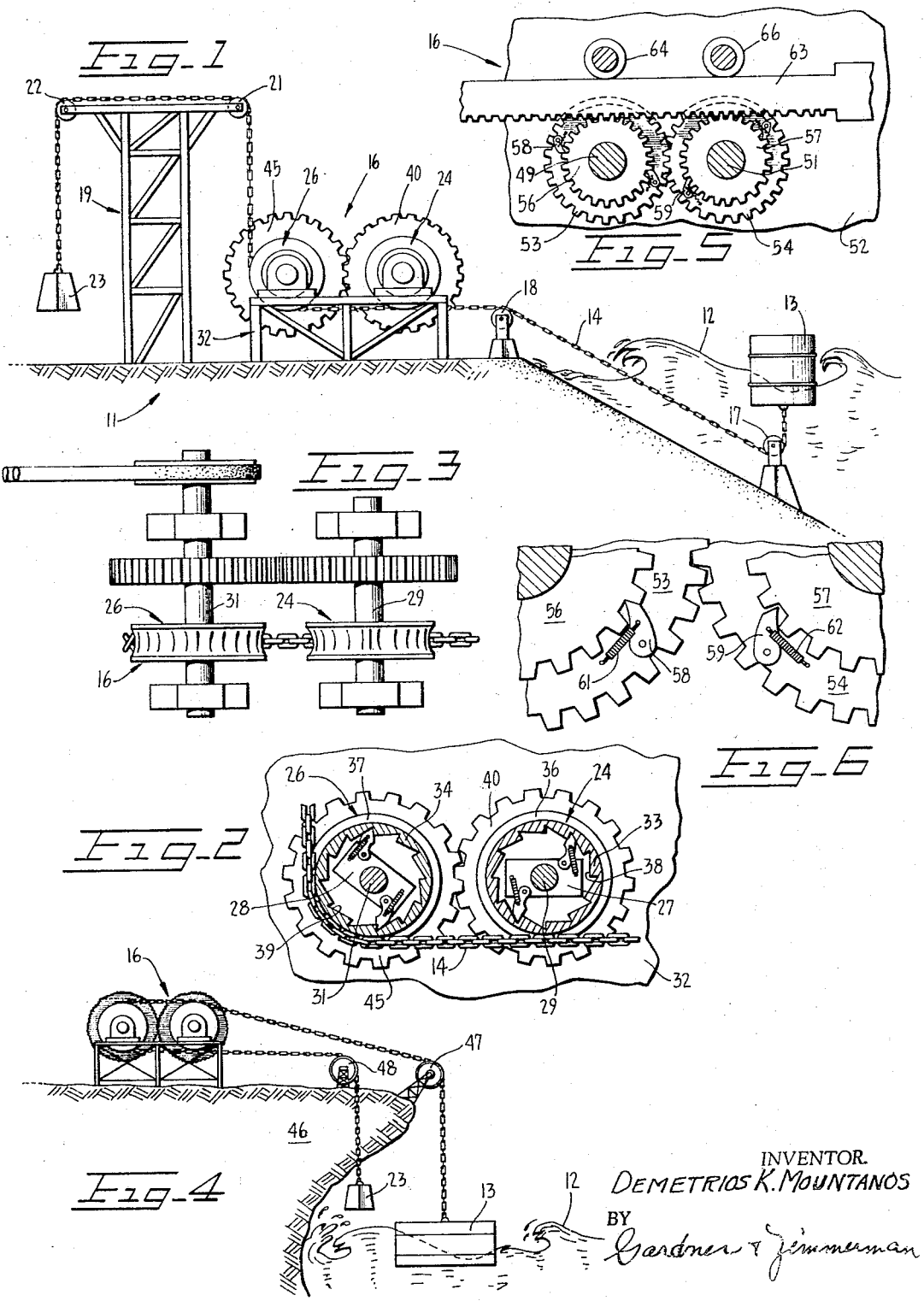

3,297,300
APPARATUS FOR DERIVING USEFUL
ENERGY FROM SEA WAVES
Demetrios K. Mountanos, 132 Eddy St.,
San Francisco, Calif. 94102
Filed Sept. 30, 1964, Ser. No. 400,335
1 Claim. (Cl. 253—8)

This invention relates to energy transformation devices in general, and is more particularly directed to apparatus for transforming the energy of sea wave motion to useful energy in the form of shaft rotation.

Sea waves represent a virtually infinite source of energy which if converted to a useable form could serve manifold utilitarian purposes. In this regard the waves are capable of periodically displacing very heavy floating objects up and down through substantial distances. The product of the weight of the object and the displacement represents work, and hence energy, which it will be appreciated may be very substantial where the weight of the object is of the order of thousands of tons and the height of the waves is of the order of tens of feet. Of course the potential energy of a floating object riding the waves is not of a useful form. In order to use this substantially undepletable source of potential energy, the energy must be transformed to shaft rotation, or another form suited to the driving of generators, etc.

It is therefore an object of the present invention to provide means for transforming the vast potential energy of seawaves to a useful form.

Another object of the invention is the provision of a seawave motor which is arranged to convert the up and down motion of a heavy floating object riding the waves to rotation of one or more output shafts.

It is still another object of the invention to provide apparatus of the class described which develops reciprocating motion in turn convertible to shaft rotation.

Yet another object of the invention is to provide motion transforming means for converting reciprocating motion to unidirectional shaft rotation wherein different length strokes of the reciprocating motion are equalized.

It is a further object of the invention to provide apparatus of the character described which is simple and relatively economical in construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a side elevational view, partially in schematic, of apparatus in accordance with the invention for transforming the potential energy of sea waves to a useful form.

FIGURE 2 is a side elevational detail view of a reciprocating motion to unidirectional shaft rotation energy transforming means of the apparatus.

FIGURE 3 is a plan view of the transforming means of FIGURE 2.

FIGURE 4 is a view similar to FIGURE 1, but of a modified form of the apparatus.

FIGURE 5 is a side elevational detail view of a modified form of reciprocating motion to unidirectional shaft rotation energy transforming means.

FIGURE 6 is a fragmentary elevation view on an enlarged scale of a portion of the energy transforming means of FIGURE 5.

Referring now to FIGURE 1 of the drawing, there is shown a shoreline 11 into which sea waves 12 roll and break. At an off-shore position there is provided a relatively heavy buoy 13, or equivalent floating structure which is displaced up and down by the waves as the alternate crests and valleys thereof traverse the position of the buoy. This wave effected movement of the heavy buoy represents substantial potential energy. In accordance with the present invention provision is made to transform this potential energy to a useful form. More particularly, the buoy 13 is connected to a chain 14, belt, or equivalent strip member which is appropriately guided to the shoreline 11 in such a manner that the up and down movement of the buoy effects reciprocation of the chain or other member. The reciprocating motion of this member in itself represents energy in a useful form; however in accordance with a particularly important feature of the invention energy transforming means 16 are provided to convert the reciprocating motion to the more useful form of unidirectional shaft rotation.

Considering now more particularly the arrangement briefly outlined above, it is to be noted that a pulley 17 is mounted in submerged position at the location of the buoy 13. In addition, a pulley 18 is mounted on the shoreline 11, as is a lifting tower 19 provided with spaced pulleys 21, 22 at its upper end. The chain 14, or its equivalent, extends vertically downward from the buoy 13, beneath the submerged pulley 17 and then over the on-shore pulley 18. Thereafter, the chain extends through the transforming means 16, which is subsequently described in detail, and upwardly over the tower pulleys 21, 22 to finally dangle down the opposite side of the tower. A counterweight 23 is secured to the free end of the chain to balance same such that the chain reciprocates under the influence of the waves 12. In this latter regard, the counterweight is of a weight equal to one-half the weight of water displaced by the buoy. The chain is thus reciprocated as the buoy moves up and down and the counter-weight undergoes a following movement.

The energy transforming means 16 may be variously provided, preferably in the manner best shown in FIGURES 2 and 3. As shown therein, there are provided a pair of sprockets 24, 26 having central portions 27, 28 rigidly secured to shafts 29, 31 journalled for rotation upon a support frame 32. The sprockets further include outer annular portions 33, 34 having peripheral teeth 36, 37 engaged by the chain 14. Such portions 33, 34 are rotatable relative to the central portions 27, 28 of the respective sprockets 24, 26. The inner peripheries of the outer portions 33, 34 are provided with ratchet teeth 38, 39, the teeth 38 being opposed to the teeth 39. The central portions 27, 28 of the sprockets are in turn respectively provided with pairs of pawls or dogs 41, 42 in resilient engagement with the ratchet teeth 38, 39. More particularly, the dogs 41, 42 are loaded as by means of springs 43, 44 in directions toward the ratchet teeth 38, 39. Accordingly, in one direction of rotation of the outer portions of the sprockets, the dogs engage the ratchet teeth to thereby effect rotation of the central portions, and therefore of the shafts associated therewith. In the opposite direction of rotation of the outer portions of the sprockets, however, the dogs resiliently override the ratchet teeth to thus disengage the central portions therefrom. It is of particular importance to note that by virtue of the teeth 38, 39 being in opposed relationship the central and outer portions 27, 33 of sprocket 24 are engaged while the central and outer portions 28, 34 of sprocket 26 are disengaged, and vice versa. In other words, responsive to reciprocation of the chain 14 in one direction, e.g., to the left as viewed in the drawing, the outer portions of both sprockets are rotated in the same direction, in this instance, clockwise. However, only the central portion 27 of sprocket 24 and shaft 29 are rotated clockwise, the central portion 28 of sprocket 26 being at this time disengaged and unaffected. Conversely, when chain 14 is reciprocated in the opposite direction (i.e., to the right) the outer portions of both sprockets are rotated in the opposite direction (i.e., counterclockwise). The central portion 28 of sprocket 26 and shaft 31 are rotated counterclockwise while the central portion of sprocket 24 is unaffected. It will be thus appreciated that both shafts 29, 31 are rotated unidirectionally in opposite directions, but intermittently in response to the reciprocating motion of chain 14.

In order that the opposed unidirectional rotations of shafts 29, 31 be less intermittent, such shafts are preferably coupled as by means of spur gears 40, 45 respectively rigidly secured to these shafts and engaged with each other. Thus when one shaft is rotated, the other normally idling shaft is driven by the rotated shaft due to the gear coupling therebetween. In this manner both shafts are unidirectionally rotated in opposite directions in response to each stroke of the chain, irrespective of the direction of the stroke. Furthermore, it will be appreciated that the length of stroke need not be constant in the development of unidirectional shaft rotation, unequal strokes being equalized by the energy transforming means 16. Moreover, it will be appreciated that a number of sprockets may be carried on each of the shafts 29, 31, and driven in response to equal numbers of floating structures.

Numerous variations are of course possible in the apparatus of the present invention, and in this regard it will be appreciated that a belt drive may be employed in place of the chain 14. Furthermore, a short length of chain just sufficiently long to extend through the energy transforming means 16 might be employed with cables secured to its opposite ends and extending to the buoy and counterweight. The arrangement of guide pulleys and lift tower might likewise be revised, for example in the manner depicted in FIGURE 4. In this case a cliff 46 exists adjacent the sea and partially overhangs same. A pulley 47 is then mounted adjacent the tip of the cliff to guide the chain 14 downwardly into attachment with the buoy 13 which is floating in the sea waves 12. The chain extends through the energy transformiing means 16 and is in turn guided over a pulley 48 mounted adjacent the edge of the cliff. The chain extends downward from pulley 48 into connection with the counterweight 23, which dangles over the cliff. In the present embodiment, the weight of the counterweight again balances the apparent weight of the buoy such that the entire system of the chain, buoy, and counterweight is balanced and reciprocates with the up and down movement of the waves 12. The transforming means 16 converts the reciprcating motion of the chain to unidirectional shaft rotation in the manner previously described. In this case the weight of the buoy must be twice the weight of the hanging counterweight.

As noted previously, the transforming means 16 may be variously provided, and in this regard may be of the modified form illustrated in FIGURES 5 and 6. More particularly, a pair of parallel shafts 49, 51 are journalled upon a frame 52 and coupled for contradirectional rotation as by means of gears 53, 54 fixedly secured to the shafts and in mesh with each other. Ratchet gears 56, 57 are respectively coaxially mounted upon the shafts 49, 51 in rotatable relation thereto and in juxtaposition with the gears 53, 54. In addition, pairs of pawls 58, 59 are pivotally mounted upon the faces of gears 53, 54 which are adjacent the ratchet gears 56, 57, and these pawls are loaded by means of springs 61, 62 into engagement with the teeth of the ratchet gears. It is to be noted that the spring loading of pawls 58 is opposite to that of pawls 59, and therefore if the ratchet gears are rotated in a given direction, e.g., clockwise, one ratchet gear 56 is rigidly enmeshed by its associated pawls 58, while the other ratchet gear 57 resiliently overrides its associated pawls 59. Gear 56 is consequently coupled to gear 53, while gear 57 is decoupled from gear 54. Gear 53, and therefore shaft 49, are thus driven by ratchet gear 56 in the clockwise direction, while shaft 51 is driven in the counterclockwise direction due to the coupling between gears 53, 54. The counterclockwise rotation of shaft 51 is unaffected by the clockwise rotation of ratchet gear 57, since this gear is now decoupled from gear 54 and freely rotatable upon shaft 51. Upon rotation of the ratchet gears 56, 57 in the opposite direction, i.e., counterclockwise, the opposite situation exists. Gear 57 is coupled to gear 54 by pawls 59, while gear 56 overrides pawls 58 and is decoupled from gear 53. As a result, shaft 51 is driven in the counterclockwise direction due to the coupling between gears 57 and 54. Shaft 49 is driven in the clockwise direction by virtue of the coupling between gears 54 and 53, and is unaffected by the counterclockwise rotating gear 56 which is now decoupled from gear 53. Thus rotation of the ratchet gears in opposite directions effects unidirectional rotation of the shafts 49, 51 respectively in opposite directions. It will be appreciated that the energy transforming means just described may be employed to convert reciprocating motion to unidirectional rotations of the shafts 49, 51. In this regard, the ratchet gears 56, 57 may be engaged by a reciprocating chain. More preferably, however, in the instant embodiment a rack 63 is maintained in engagement with gears 56, 57 as by means of guide rolls 64, 66. The opposite ends of the rack may then be secured for example, to the chain 14 of the sea wave energy extracting arrangement. The rack could of course be driven by a reciprocating piston, or the like, for use with other prime movers. In any case the rack is reciprocated to rotate the ratchet gears in alternately opposite directions, thus resulting in unidirectional rotations of the shafts 49, 51 in opposite directions.

What is claimed is:

Apparatus for converting wave motion into useful energy comprising, in combination, a support, a pair of aligned spaced power producing shafts rotatably mounted on said support, a power take-off means connected to one of said shafts, a pair of meshing gears, one mounted on each shaft, interconnecting said shafts for simultaneous rotation in opposite directions, a rectangular block fixed to an intermediate point on each shaft, oppositely disposed pawls pivotally mounted on each block, a sprocket having a hallow circular interior opening rotatable on each shaft surrounding an associated block, ratchet teeth on the inner periphery of each opening, the ratchet teeth of the two sprockets being oppositely disposed, said sprockets being linearly aligned, spring means biasing each pawl towards the ratchet teeth of its associated sprocket, the exterior periphery of each sprocket being transversely concaved and provided with chain engaging teeth, a chain extending beneath both aligned sprockets in engagement with said teeth, a first exteriorly mounted pulley over which said chain extends, a second exterior pulley located beneath the surface of an adjacent body of water under which said chain extends, a float in the body of water connected to that end of the chain, a tower adjacent said support, a transversely extending arm at the top of said tower, a third pulley at one end of said arm directly over the outside periphery of the sprocket remote from said float, the other end of said chain extending upwardly perpendicular to the length of chain beneath said aligned sprockets, a fourth pulley at the other end of said arm, said other end of said chain extending over said fourth pulley and depending vertically, and a weight secured to the depending end of said chain, said weight being equal to one-half the weight of the water displaced by said buoy.

(References on following page)

References Cited by the Examiner

UNITED STATES PATENTS

| | | | |
|---|---|---|---|
| 332,875 | 12/1885 | Bussard et al. | |
| 597,553 | 1/1898 | Dyer. | |
| 627,533 | 6/1899 | Ryan | 253—10 |
| 755,799 | 3/1904 | Schlueter | 253—8 X |
| 1,098,208 | 5/1914 | Abbott | 253—10 |
| 1,318,469 | 10/1919 | Wilkinson. | |
| 1,446,286 | 2/1923 | Bearman | 253—10 |
| 1,497,205 | 6/1924 | Boosinger | 253—10 |

MARTIN P. SCHWADRON, *Primary Examiner.*

EDGAR W. GEOGHEGAN, *Examiner.*

E. A. POWELL, Jr., *Assistant Examiner.*